United States Patent
Yoshida

(10) Patent No.: US 9,338,358 B2
(45) Date of Patent: May 10, 2016

(54) IMAGE CAPTURE APPARATUS AND CONTROL METHOD FOR REFLECTING EXPOSURE COMPENSATION

(75) Inventor: Nobukazu Yoshida, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 31 days.

(21) Appl. No.: 13/559,733

(22) Filed: Jul. 27, 2012

(65) Prior Publication Data

US 2013/0057745 A1 Mar. 7, 2013

(30) Foreign Application Priority Data

Sep. 2, 2011 (JP) ................................. 2011-192036

(51) Int. Cl.
*H04N 5/235* (2006.01)
*H04N 5/232* (2006.01)
*H04N 5/243* (2006.01)
*H04N 101/00* (2006.01)

(52) U.S. Cl.
CPC ......... *H04N 5/23293* (2013.01); *H04N 5/2351* (2013.01); *H04N 5/243* (2013.01); *H04N 2101/00* (2013.01)

(58) Field of Classification Search
USPC ................................ 348/222.1, 229.1, 333.01
See application file for complete search history.

(56) References Cited

U.S. PATENT DOCUMENTS

| | | | |
|---|---|---|---|
| 2003/0122939 A1* | 7/2003 | Bell et al. | 348/229.1 |
| 2004/0119835 A1 | 6/2004 | Okamura | |
| 2010/0013955 A1* | 1/2010 | Nagasaki | 348/229.1 |
| 2010/0315531 A1 | 12/2010 | Bell et al. | |

FOREIGN PATENT DOCUMENTS

| | | |
|---|---|---|
| CN | 101552873 A | 10/2009 |
| JP | 2003-163833 | 6/2003 |
| JP | 2007-027984 A | 2/2007 |

OTHER PUBLICATIONS

Chinese Office Action issued in corresponding application No. 201210312609.3 on Nov. 4, 2014.
Japanese Office Action issued in corresponding application No. 2011-192036 on May 22, 2015.

* cited by examiner

*Primary Examiner* — Joel Fosselman
(74) *Attorney, Agent, or Firm* — Carter, DeLuca, Farrell & Schmidt, LLP

(57) ABSTRACT

An image capture apparatus includes an image data acquisition unit which acquires image data, a photometry unit which performs photometry using the image data, an exposure control unit which performs exposure control when the image data acquisition unit acquires image data, a gain control unit which performs gain control for the image data, a display unit which displays a captured image reflecting the exposure compensation value set by a setting unit, and a control unit which controls to, when the exposure compensation value falls within a predetermined range, reflect the exposure compensation value on the exposure control by the exposure control unit, and when the exposure compensation value falls outside the predetermined range, reflect the exposure compensation value on the exposure control by the exposure control unit and the gain control by the gain control unit.

12 Claims, 6 Drawing Sheets

F I G. 4
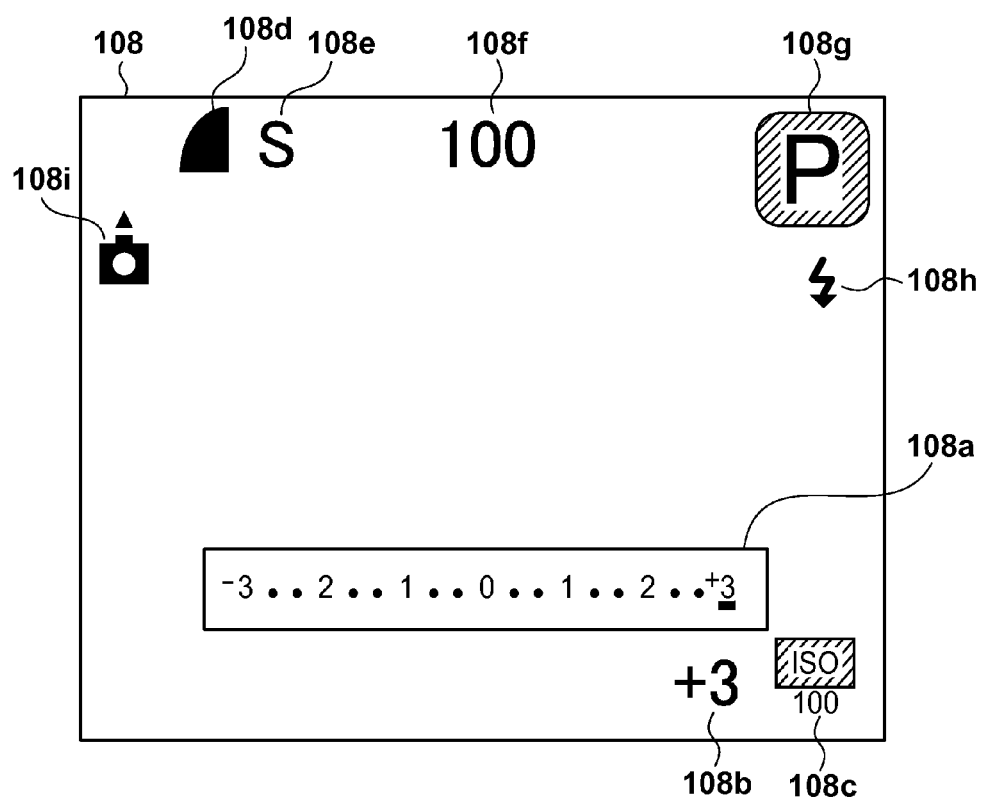

IMAGE CAPTURE APPARATUS AND CONTROL METHOD FOR REFLECTING EXPOSURE COMPENSATION

BACKGROUND OF THE INVENTION

1. Field of the Invention

The present invention relates to exposure control and display control of an image capture apparatus.

2. Description of the Related Art

Conventionally, some image capture apparatuses have a function of allowing the user to compensate the exposure level; that is, a so-called exposure compensation function. Some of these image capture apparatuses allow the user to set an exposure compensation value while checking the effect of exposure compensation by displaying an image reflecting exposure compensation on a display unit. However, when photometry is performed while an exposure compensation value set by the user is reflected on the exposure level, the exposure level deviates from an optimum exposure level, decreasing the photometric accuracy. Especially when the exposure compensation value is set in the positive direction (the direction in which brightness increases) and reflected on the exposure level, an image data signal is saturated, disabling normal photometry processing.

To solve this problem, some conventional image capture apparatuses display, on a display unit, an image reflecting an exposure compensation value while maintaining the photometric accuracy. For this purpose, the gain of an amplification means for an output from the image sensor is compensated by the exposure compensation value, while the exposure time of an image sensor is controlled based on the illuminance of an object. This technique is described in, for example, Japanese Patent Laid-Open No. 2003-163833.

However, the technique described in Japanese Patent Laid-Open No. 2003-163833 implements compensation of the exposure level by only signal amplification without using the stop or exposure time. In particular, when the exposure compensation value is large, the noise of a display image increases.

SUMMARY OF THE INVENTION

The present invention has been made to solve the above problems, and suppresses a decrease in photometric accuracy and an increase in noise in an image capture apparatus while displaying an image reflecting exposure compensation.

According to a first aspect of the present invention, there is provided an image capture apparatus comprising: a setting unit which sets an exposure compensation value; an acquisition unit which acquires image data; a photometry unit which performs photometry using the image data acquired by the acquisition unit; an exposure control unit which performs exposure control when the acquisition unit acquires image data; a gain control unit which performs gain control for the image data acquired by the acquisition unit; a display unit which displays a captured image reflecting the exposure compensation value set by the setting unit; and a control unit which controls to, when the exposure compensation value falls within a predetermined range, reflect the exposure compensation value on the exposure control by the exposure control unit, and when the exposure compensation value falls outside the predetermined range, reflect the exposure compensation value on the exposure control by the exposure control unit and the gain control by the gain control unit.

According to a second aspect of the present invention, there is provided a method of controlling an image capture apparatus, comprising: a setting step of setting an exposure compensation value; an acquisition step of acquiring image data; a photometry step of performing photometry using the image data acquired in the acquisition step; an exposure control step of performing exposure control when image data is acquired in the acquisition step; a gain control step of performing gain control for the image data acquired in the acquisition step; a display step of displaying a captured image reflecting the exposure compensation value set in the setting step; and a control step of controlling to, when the exposure compensation value falls within a predetermined range, reflect the exposure compensation value on the exposure control in the exposure control step, and when the exposure compensation value falls outside the predetermined range, reflect the exposure compensation value on the exposure control in the exposure control step and the gain control in the gain control step.

Further features of the present invention will become apparent from the following description of exemplary embodiments, with reference to the attached drawings.

BRIEF DESCRIPTION OF THE DRAWINGS

FIG. 4 is a view exemplifying display of an exposure compensation bar according to the embodiment of the present invention;

DESCRIPTION OF THE EMBODIMENTS

An embodiment of the present invention will now be described in detail with reference to the accompanying drawings.

Figure 1:
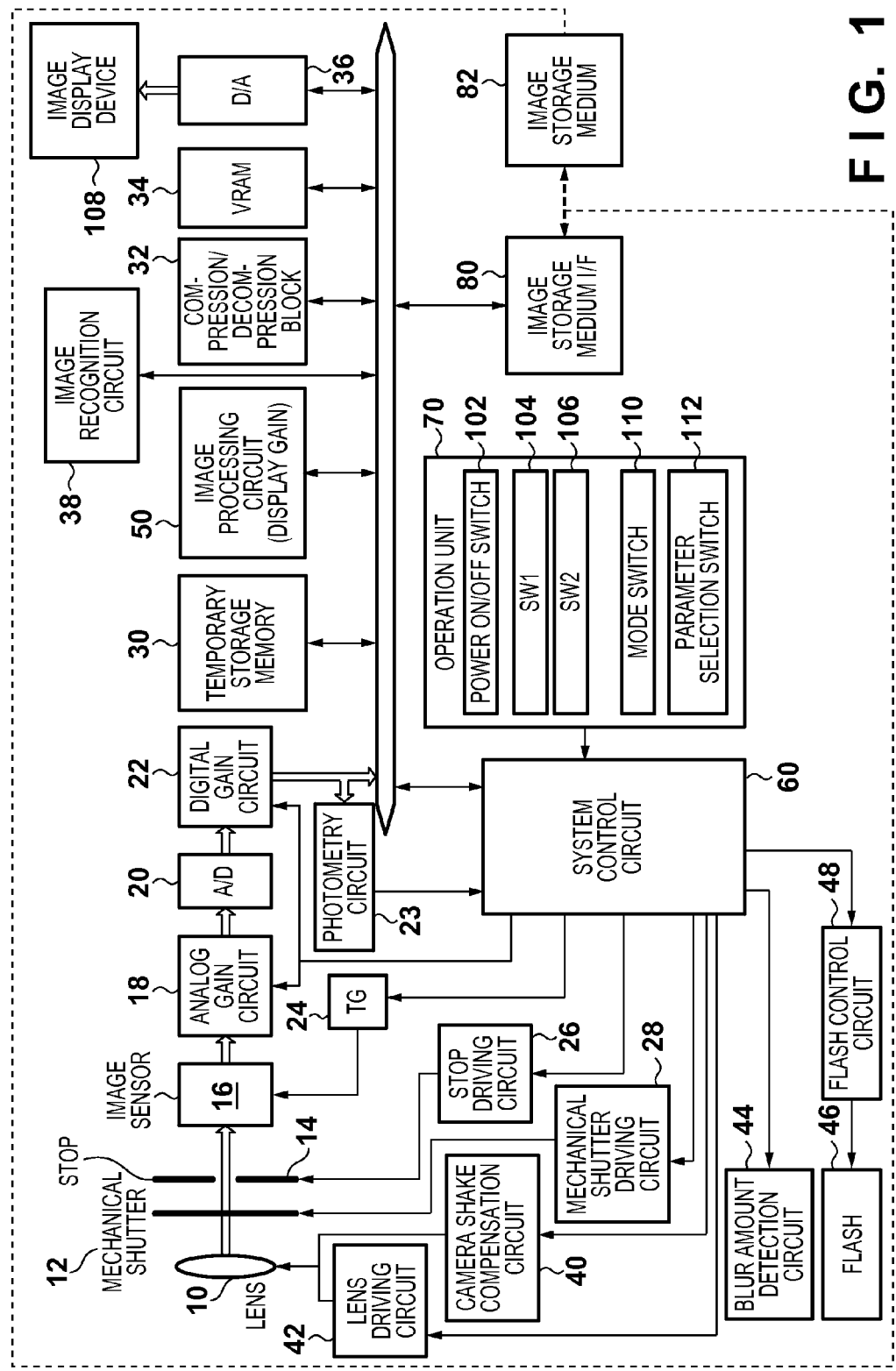
FIG. 1 is a block diagram showing the arrangement of an image capture apparatus according to an embodiment of the present invention.

FIG. 1 is a block diagram showing the arrangement of a digital camera as an embodiment of an image capture apparatus according to the present invention. Referring to FIG. 1, a lens 10 condenses external light. A lens driving circuit 42 can adjust the focus and the angle of view by moving the lens position back and forth along the optical axis. Optical camera shake compensation can also be performed by driving the lens by a camera shake compensation circuit 40, based on a camera blur amount measured by a blur amount detection circuit 44, so as to change the optical axis in a direction in which a camera shake is canceled. The blur amount detection circuit 44 includes a gyro sensor. In FIG. 1, camera shake compensation is implemented by driving the lens. However, the camera shake can be similarly compensated by driving an image sensor 16. A stop 14 can adjust the quantity of light having passed through the lens 10. A system control circuit 60 can control the stop 14 by transferring stop control information to a stop driving circuit 26. The stop 14 is an iris diaphragm formed from a plurality of blades or a round diaphragm configured by forming holes in a plate at various diameters. By using the stop 14 and stop driving circuit 26, the system control circuit 60 can control to narrow down the stop and decrease the light quantity when the brightness value is large, and can control to set the stop to a full-aperture state and receive a large quantity of light when it is small. The system control circuit 60 can control a mechanical shutter 12 by transferring mechanical shutter control information to a mechanical shutter driving circuit 28. The exposure time in still image shooting is determined by the open/close time of the mechanical shutter 12. The system control circuit 60 determines the time, and issues an instruction to the mechanical shutter driving circuit 28.

The image sensor 16 receives light having passed through the lens 10, mechanical shutter 12, and stop 14. The system control circuit 60 can control the image sensor 16 by transferring an image sensor control signal to a TG (Timing Generator) 24. The TG 24 drives the image sensor 16 based on the control information received from the system control circuit 60. The image sensor 16 cyclically performs exposure and read of data upon exposure. This work is executed in accordance with a driving signal from the TG 24. The TG 24 can control the exposure time of the image sensor 16. In this case, the TG 24 outputs a driving signal to the image sensor 16 so that charges in it are released at an arbitrary timing.

An analog gain circuit 18 can attenuate/amplify the level of an image signal read out from the image sensor 16. The system control circuit 60 can control the amplification amount by transferring an amplification level to the analog gain circuit 18. An A/D converter (Analog/Digital converter) 20 converts the image signal from an analog signal into a digital signal. Depending on a device, a digital signal has a bit width of 10 bits, 12 bits, 14 bits, or the like. An image processing circuit 50 on a subsequent stage can cope with a plurality of types of bit widths. Image data digitized by the A/D converter 20 is input to a digital gain circuit 22. The digital gain circuit 22 can attenuate/amplify the image data level. The system control circuit 60 can control the amplification amount by transferring an amplification level to the digital gain circuit 22. In general, the exposure level of the image sensor 16 can be set to an optimum exposure level by properly setting the amount of exposure on the image sensor 16 by the stop 14, and appropriately setting the exposure time by the mechanical shutter 12. However, the analog gain circuit 18 and digital gain circuit 22 can pseudo-change the exposure level of image data by attenuating/amplifying an image data signal. The user can be provided with this function based on a concept "sensitivity", which is one exposure condition in shooting in addition to the aperture and shutter speed. More specifically, the stop 14, mechanical shutter 12, analog gain circuit 18, digital gain circuit 22, and the like perform exposure control. Image data input to a photometry circuit 23 (to be described later) is acquired via the image sensor 16, analog gain circuit 18, A/D converter 20, and digital gain circuit 22. When the digital gain circuit 22 is not used, image data acquired via the image sensor 16, analog gain circuit 18, and A/D converter 20 is input to the photometry circuit 23.

A flash 46 can emit light under the control of a flash control circuit 48. When an object is dark, in a backlit state or at low illuminance, the flash can emit light to photograph the object brightly.

Image data output from the digital gain circuit 22 is input to the photometry circuit 23. The photometry circuit 23 extracts a luminance signal from the input image data (photometry image data). The system control circuit 60 calculates a luminance difference between the luminance signal of the image and an optimum level based on the extracted luminance signal. The system control circuit 60 then controls the stop 14, exposure time, analog gain circuit 18, and digital gain circuit 22 so that the luminance signal of the image data comes close to the optimum level.

Also, image data output from the digital gain circuit 22 is input to the image processing circuit 50. The image processing circuit 50 is formed from a plurality of blocks, and implements various functions. The image processing circuit 50 can extract color information from image data, and use it for white balance processing of identifying the light source of an object and properly adjusting the color. The image processing circuit 50 also has a function of extracting only the frequency component of image data, and this function can be used in auto focus control (AF). Further, the image processing circuit 50 has a function of increasing/decreasing the level of input image data, and manipulating the color effect of an image and the like. The image processing circuit 50 plays a role of adjusting the quality of a shot image. Level control of an image signal (gain control for image data) can be achieved by various methods. For example, there are available a function of increasing/decreasing the level at a uniform amplification factor for the entire image, a tone curve (gamma) function of converting a signal level in accordance with an original signal level, and a function of increasing/decreasing the level at an amplification factor corresponding to the frequency component of each area within a frame. In particular, the image processing circuit 50 amplifies the level of image data, raising the signal level of image data corresponding to a captured image displayed on an image display device 108 (to be referred to as display gain-up hereinafter). The amplification amount of the image data level in the image processing circuit 50 will be called a display gain. In this case, display gain-up (gain control) does not act on image data input to the photometry circuit 23. Thus, only the signal level of image data corresponding to a captured image to be displayed can be amplified without amplifying data used for photometry.

Image data output from the digital gain circuit 22 can be stored in a temporary storage memory 30 simultaneously when it is input to the image processing circuit 50. The image data once stored in the temporary storage memory 30 can be read out again. The system control circuit 60 can refer to the image data, or the readout image data can be input to the image processing circuit 50. Further, image data having undergone image processing by the image processing circuit 50 can be written back in the temporary storage memory 30, or arbitrary data can be written in the system control circuit 60.

Image data appropriately processed by the image processing circuit 50 can be input to an image recognition circuit 38. The image recognition circuit 38 can recognize the brightness, focusing state, and color of an input image. In addition, the image recognition circuit 38 can recognize the face and facial expression of a person, and when a text exists, the textual information. The image recognition circuit 38 can also generate the histogram of an input image. The image recognition circuit 38 can receive a plurality of images. For example, the image recognition circuit 38 can receive two images and compare the features of these two images, thereby determining whether these images are identical. In addition to the method of recognizing an image by the image recognition circuit, the system control circuit 60 can also perform image recognition processing. By executing a program coded in advance on the CPU, the system control circuit 60 can read out image data stored in the temporary storage memory 30, analyze it, and recognize a scene.

When outputting image data to the image display device 108 such as an LCD, image data having undergone image processing by the image processing circuit 50 is rasterized in a VRAM 34, converted into an analog signal by a D/A conversion circuit 36, and displayed on the image display device 108. An electronic viewfinder can be implemented by sequentially displaying and updating successive captured images read out from the image sensor 16 on the image display device 108. Data rasterized in the VRAM 34 is data for which the image processing circuit 50 has performed display gain-up, unlike image data input to the photometry circuit 23. Since the image display device 108 displays data in the VRAM 34, the display image on the image display device 108 and an image corresponding to image data input to the photometry circuit 23 are different in brightness by the display gain.

The image display device 108 can display not only an image but also arbitrary information singly or together with an image. The image display device 108 can also display a camera status, text information of shooting information such as the shutter speed, F-number, and ISO sensitivity selected by the user or determined by the camera, a graph such as a luminance distribution measured by the image processing circuit 50, a face recognition result, a scene recognition result, and the like. The information display position and display color can be arbitrarily selected. By displaying various kinds of information, the image display device 108 can provide a user interface. The image display device 108 can display image data stored in an image storage medium 82. When image data is compressed, it is decompressed by a compression/decompression block 32 and rasterized in the VRAM 34. The D/A conversion circuit 36 converts the data into an analog signal, outputting the analog signal.

The image storage medium 82 is a non-volatile storage medium, and can mainly store shot image data. As for storage of image data, a folder hierarchy can be defined, or folders and files can be named in ascending order upon shooting. Shooting information (for example, F-number, shutter speed, and ISO sensitivity), shooting time, and the like can be added to each image data, and stored together with the image data. Needless to say, stored image data can be read out, copied, moved, and erased.

An operation unit 70 includes a power switch 102 capable of switching power ON/OFF of the system, shutter switches SW1 104 and SW2 106 for designating shooting, a mode switch 110, and a parameter selection switch 112. The shutter switch SW1 104 is turned on during an operation to a shutter button (not shown), and designates the start of shooting preparation operations such as auto exposure control and focus control. The shutter switch SW2 106 is turned on upon completion of the operation to the shutter button (not shown), and can implement operations to designate still image shooting and image recognition. The mode switch 110 can switch the camera operation mode between the still image shooting mode, the moving image shooting mode, and the playback mode. The parameter selection switch 112 allows the user to select shooting conditions in shooting such as the exposure compensation value, distance measurement area, and photometry mode, page feed in shot image playback, general camera operation settings, and the like. The parameter selection switch 112 also allows the user to select ON/OFF of the above-mentioned electronic viewfinder. The image display device 108 displays an image, and can be formed from a touch panel to serve as an input device.

Figure 2:
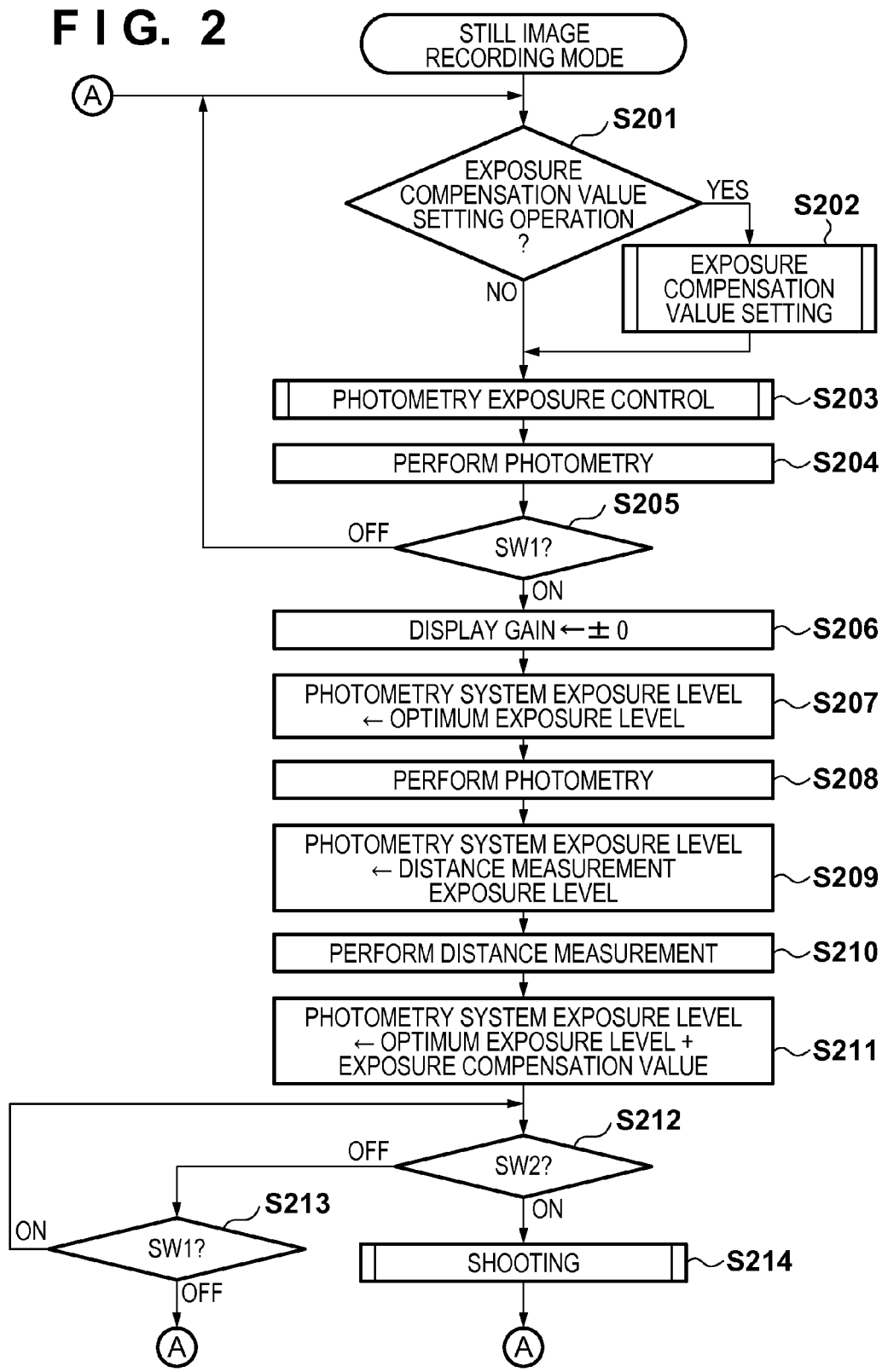
FIG. 2 is a flowchart showing still image recording mode processing according to the embodiment of the present invention.

FIG. 2 is a flowchart showing still image recording mode processing. The system control circuit 60 determines whether the user has performed an operation using the operation unit 70 to set an exposure compensation value (step S201). If the user has not performed the operation, the process advances to step S203 without any processing.

If the user has performed the exposure compensation value setting operation, the process advances to step S202 to set an exposure compensation value, and then to step S203. The exposure compensation value setting processing in step S202 will be described later with reference to FIG. 3.

The system control circuit 60 performs photometry exposure control in step S203, and then performs photometry processing in step S204. The system control circuit 60 calculates a brightness value based on an image data luminance signal extracted by the photometry circuit 23. The photometry exposure control processing in step S203 will be described later with reference to FIG. 4.

In step S205, the system control circuit 60 determines whether the shutter switch SW1 is ON. If the shutter switch SW1 is OFF, the process returns to step S201; if ON, to step S206. In step S206, the system control circuit 60 sets, to 0, the amount of display gain-up to be executed within the image processing circuit 50, so that the image display device 108 displays an image having the same brightness as that of an image corresponding to image data input to the photometry circuit 23.

In step S207, the system control circuit 60 sets a photometry system exposure level to an optimum exposure level. The photometry system exposure level is the exposure level of image data input to the photometry circuit 23, and can be adjusted by controlling the stop 14, the exposure time of the image sensor 16, the analog gain circuit 18, and the digital gain circuit 22. To obtain high photometric accuracy, the photometry system exposure level is properly controlled regardless of an exposure compensation value set by the user. In step S208, the system control circuit 60 performs photometry processing to calculate a brightness value. Since photometry can be executed in step S208 while the photometry system exposure level is set to an optimum exposure level, high-accuracy photometry can be performed.

In step S209, the system control circuit 60 controls the photometry system exposure level to an exposure level suited to distance measurement based on the brightness value calculated in step S208. The image processing circuit 50 performs distance measurement processing based on a frequency component extracted from input image data, so input image data to the image processing circuit 50 serves as input data for distance measurement processing. Input image data to the image processing circuit 50 and input image data to the photometry circuit 23 have the same exposure level. By controlling the photometry system exposure level, distance measurement input data is set to an exposure level suitable for distance measurement. Basically, the distance measurement exposure level is an optimum exposure level obtained from a brightness value, but can also be an exposure level compensated for distance measurement processing. After the control to the distance measurement exposure level in step S209, distance measurement processing is performed in step S210 to focus on the object.

After the end of distance measurement processing in step S210, the system control circuit 60 controls in step S211 the photometry system exposure level to an exposure level compensated from the optimum exposure level by the exposure compensation value. Even an image displayed on the image display device 108 has a brightness reflecting the exposure compensation value, and the user can preview an actually shot image. The display gain remains 0 set in step S206, and reflects the exposure compensation value at the stage of the photometry system exposure level. Hence, the exposure level can be compensated not only by the analog gain circuit 18 and digital gain circuit 22, but also by the stop 14 and the exposure time of the image sensor 16. Therefore, even when the exposure compensation value is set on the positive side (direction in which brightness increases), the exposure level is compensated by opening the stop or prolonging the exposure time. The noise of a display image can be suppressed much more than in a case in which the exposure level is compensated to brighten a display image using display gain-up. Suppressing of the noise of a preview display image has effects such as easy framing.

The system control circuit 60 determines whether the shutter switch SW2 is ON (step S212). If the shutter switch SW2 is OFF, the process advances to step S213; if ON, to step S214. In step S213, the system control circuit 60 determines whether the shutter switch SW1 is ON. If the shutter switch SW1 is ON, the process advances to step S212; if OFF, returns to step S201. While SW1 is ON and SW2 is OFF, steps S212 an S213 are repeated. The process advances to step S214 to shoot a still image, and returns to step S201. The shooting processing in step S214 will be described later with reference to FIG. 5.

Figure 3:
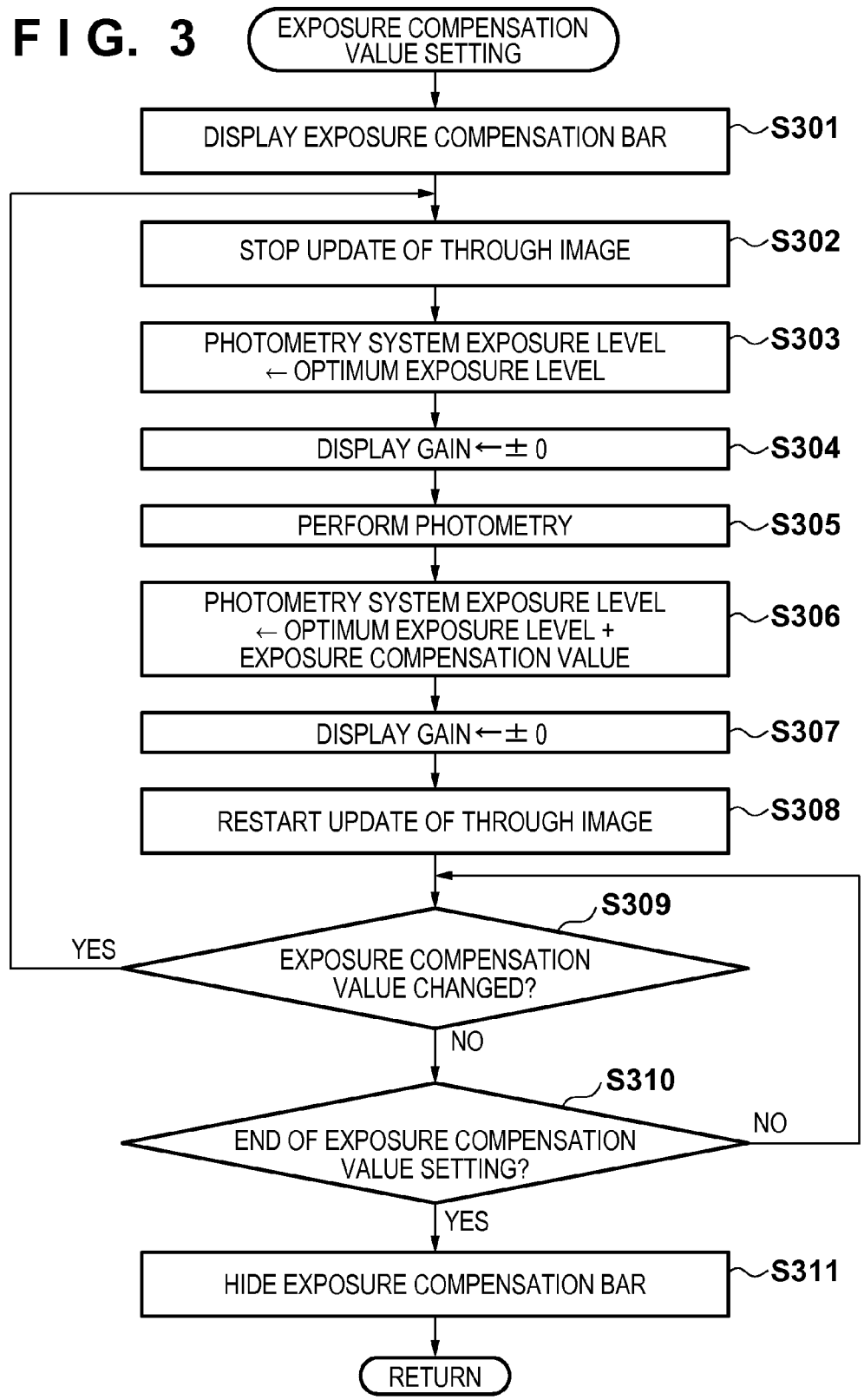
FIG. 3 is a flowchart showing exposure compensation value setting processing according to the embodiment of the present invention.

FIG. 3 is a flowchart showing the exposure compensation value setting processing in step S202. After the start of exposure compensation value setting processing, the system control circuit 60 displays an exposure compensation bar on the image display device 108 (step S301). FIG. 4 exemplifies a display when the exposure compensation bar is displayed. The image display device 108 displays an exposure compensation bar 108a, exposure compensation value 108b, ISO sensitivity setting 108c, compression ratio setting 108d, image size setting 108e, shootable image count 108f, shooting mode icon 108g, flash setting 108h, and camera orientation icon 108i. The exposure compensation bar 108a displays a currently set exposure compensation value and selectable exposure compensation values. By operating the operation unit 70, the user can select a compensation value.

The system control circuit 60 stops update of an image (to be also referred to as a through image hereinafter) displayed on the image display device 108 in step S302. The system control circuit 60 then sets the photometry system exposure level to an optimum exposure level (step S303), sets the display gain to 0 (step S304), and performs photometry at the optimum exposure level (step S305). To obtain high photometric accuracy, the photometry system exposure level is temporarily set to an optimum exposure level to perform photometry. When photometry is executed in steps S303 to S305 while the through image reflects the exposure compensation value, the process of temporarily changing the exposure level to an optimum exposure level may be seen. To avoid this, update of the through image is suspended in step S302.

After the brightness value is calculated in photometry processing in step S305, the system control circuit 60 obtains an optimum exposure level from the brightness value, and controls the photometry system exposure level to an exposure level compensated from the optimum exposure level by the exposure compensation value (step S306). The system control circuit 60 sets the display gain to 0 (step S307).

In step S308, the system control circuit 60 restarts update of the through image on the image display device 108. After the through image is updated, the image display device 108 displays an image reflecting the exposure compensation value, and the user can check the effect of the set exposure compensation value. The through image displayed in step S308 reflects the exposure compensation value in steps S306 and S307 without using display gain-up. Noise is therefore suppressed, compared to the case of using display gain-up. Since noise of the display image is suppressed, the user can easily check the effect of the exposure compensation value.

The system control circuit 60 determines whether the exposure compensation value has been changed via the operation unit 70 (step S309). If the exposure compensation value has been changed, the process returns to step S302 to perform processing of displaying a through image reflecting the latest exposure compensation value.

If no exposure compensation value has been changed (NO in step S309), the system control circuit 60 determines whether the user has performed an operation using the operation unit 70 to end the exposure compensation value setting processing (step S310). If the user has not performed the setting end operation, the process returns to step S309. If the user has performed the setting end operation (YES in step S310), the exposure compensation bar 108a displayed on the image display device 108 is hidden in step S311, ending the exposure compensation value setting processing in step S202.

Figure 5:
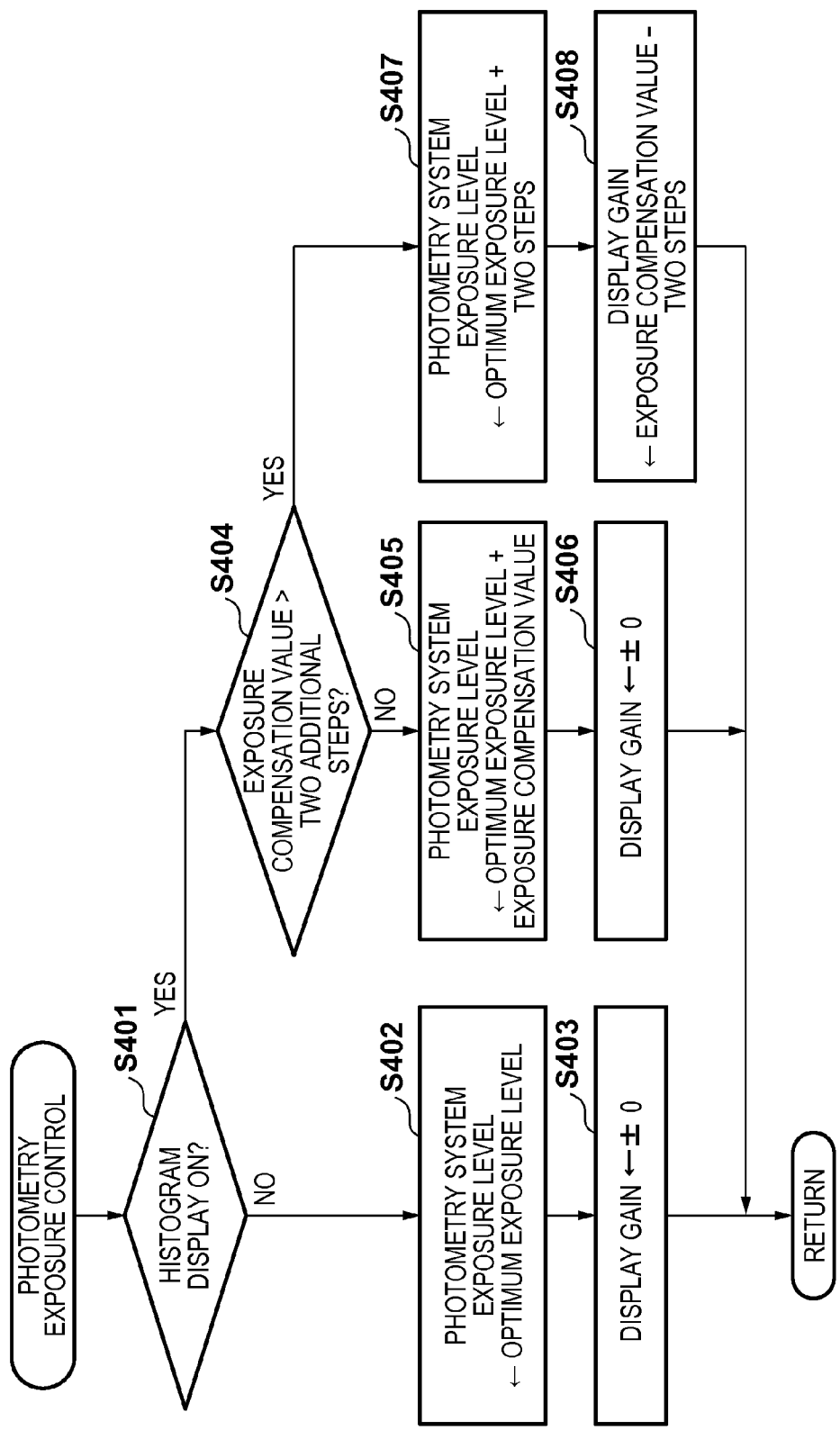
FIG. 5 is a flowchart showing photometry exposure control processing according to the embodiment of the present invention.

FIG. 5 is a flowchart showing the photometry exposure control processing in step S203. The system control circuit 60 determines a current histogram display setting (step S401). If the histogram display is OFF, the process advances to step S402. The user can set the display of the histogram using the operation unit 70.

If the histogram display setting is OFF (NO in step S401), the system control circuit 60 controls the photometry system exposure level to an optimum exposure level (step S402), and sets the display gain to 0 (step S403). Photometry is executed at the optimum exposure level, and an image displayed on the image display device 108 also has the optimum exposure level.

If the histogram display setting is ON (YES in step S401), the process advances to step S404. A histogram to be displayed is given the preview effect of the histogram of an actually shot image. For this purpose, the histogram of an image reflecting an exposure compensation value is generated. Thus, the brightness of image data is compensated by the exposure compensation value using the photometry system exposure level and display gain.

The system control circuit 60 determines whether the set exposure compensation value is larger than two additional steps (predetermined range) (step S404). If the exposure compensation value is equal to or smaller than two additional steps (it does not exceed the predetermined range and falls within the predetermined range), the process advances to step S405. If the exposure compensation value is equal to or smaller than two additional steps (NO in step S404), the system control circuit 60 controls the photometry exposure level to an exposure level compensated from the optimum exposure level by the exposure compensation value (step S405). The system control circuit 60 sets the display gain to 0 (step S406). An input to the photometry circuit 23 becomes an image exceeding the optimum exposure level by a maximum of two steps. However, it is determined that the exposure level falls within the range in which the photometric accuracy is maintained, so the photometry exposure level absorbs the exposure compensation value.

If the exposure compensation value is larger than two additional steps (it exceeds the predetermined range and falls outside the predetermined range) (YES in step S404), the system control circuit 60 controls the photometry exposure level to an exposure level compensated from the optimum exposure level by two additional steps (step S407). The system control circuit 60 sets, in the display gain, (exposure compensation value—2) steps which cannot be compensated by the photometry exposure level, that is, correspond to the difference between the exposure compensation value and a value at the end of the predetermined range (step S408). The photometry exposure level is compensated from the optimum exposure level by up to two additional steps at which the photometric accuracy can be maintained, and the remaining exposure compensation value is compensated by the display gain.

When the exposure compensation value is set on the negative side, a signal need not be attenuated using the display gain. This is because when image data is attenuated within the image processing circuit 50, signals equal to or higher than a given level may not exist and the image data range may narrow. When the exposure level is decreased using the stop 14 or the exposure time, a signal of an object brighter than the exposure level reaches the saturation level (that is, the data range remains unchanged). However, when image data is attenuated using the display gain, even a signal of a bright object does not reach the saturation level. After the end of setting the photometry exposure level and display gain, the photometry exposure control processing in step S203 ends.

Figure 6:
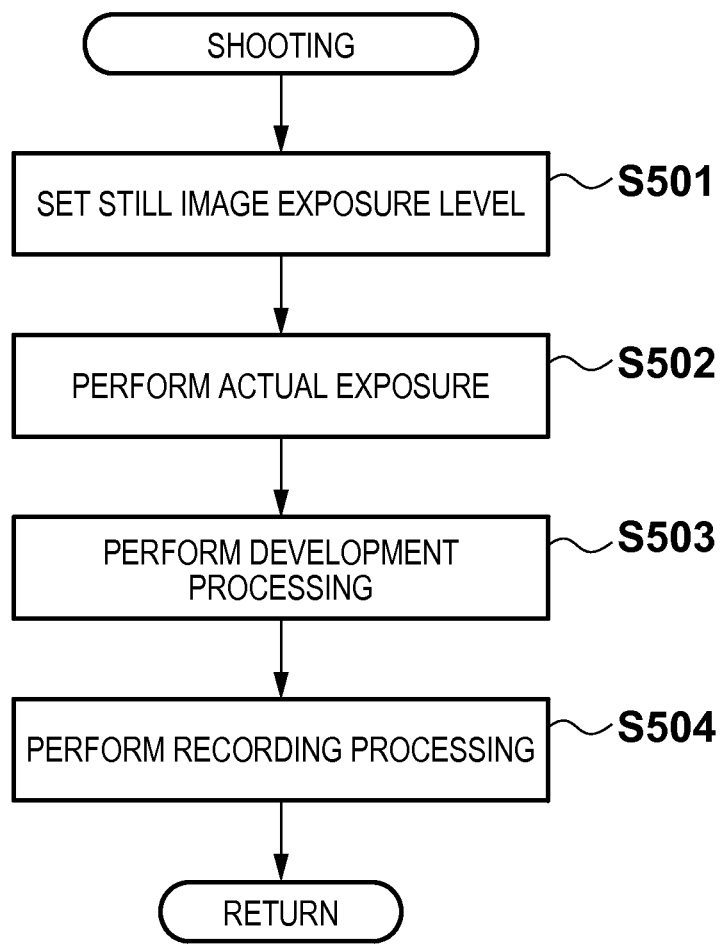
FIG. 6 is a flowchart showing shooting processing according to the embodiment of the present invention.

FIG. 6 is a flowchart showing the shooting processing in step S214 of FIG. 2. In step S501, the system control circuit 60 sets a still image exposure level based on the photometry value stored in step S208. When the user sets an exposure compensation value using the operation unit 70, the exposure level is shifted from the optimum exposure level based on the photometry result by the exposure compensation value. When light is emitted to shoot an image, the light emission setting for actual exposure is made by performing a light control operation.

Upon completion of the exposure setting, the process advances to an exposure operation in step S502. Data obtained by exposure is stored in the temporary storage memory 30. Then, development processing is performed for the captured data in step S503. The developed data is recorded on the image storage medium 82 via an image storage medium I/F 80 (step S504), ending the shooting processing in step S214.

As described above, only when the exposure compensation value exceeds two additional steps in performing photometry while displaying an image reflecting an exposure compensation value, display gain-up is executed (steps S404 to S408). While maintaining the photometric accuracy, noise of the display image can be minimized.

An image reflecting an exposure compensation value is also displayed in other cases (steps S211 and S308). However, no photometry is performed in this state, so the photometry system exposure level is compensated by the exposure compensation value regardless of whether the exposure compensation value is large. At this time, display gain-up is not executed, the exposure level can be compensated by the stop 14 or the exposure time, and noise of the display image can be suppressed.

The threshold of the exposure compensation value used to perform display gain-up is fixed to two additional steps in the above description, but may be set in accordance with the dynamic range of the image sensor. Especially when the dynamic range changes depending on the image sensor driving mode, the threshold of the exposure compensation value may be set small (predetermined range may be narrowed) in driving having a narrow dynamic range.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-192036, filed Sep. 2, 2011, which is hereby incorporated by reference herein in its entirety.

What is claimed is:

1. An image capture apparatus comprising a processor and a memory which function as:
    a setting unit which sets an exposure compensation value in response to a selecting operation by a user;
    an acquisition unit which acquires image data;
    a photometry unit which performs photometry using the image data acquired by the acquisition unit;
    an exposure control unit which performs exposure control to acquire the image data by the acquisition unit;
    a gain control unit which performs gain control for the image data acquired by the acquisition unit;
    a display unit which displays a captured image reflecting the exposure compensation value set by the setting unit; and
    a control unit which controls, in a case that the exposure compensation value falls within a predetermined range, the exposure control unit to acquire the image data based on the exposure compensation value, and controls, in a case that the exposure compensation value falls outside the predetermined range, the exposure control unit to acquire the image data based on a value at an end of the predetermined range and the gain control unit to control the gain for the image data based on a difference between the exposure compensation value and the value at the end of the predetermined range.

2. The image capture apparatus according to claim 1, wherein, even when the exposure compensation value falls outside the predetermined range, if photometry is not performed using the image data acquired by the acquisition unit, the control unit controls not to perform the gain control by the gain control unit based on the exposure compensation value for the image data.

3. The image capture apparatus according to claim 1, wherein when the exposure compensation value is a value in a direction which the captured image becomes dark, the control unit controls not to perform the gain control by the gain control unit based on the exposure compensation value.

4. The image capture apparatus according to claim 1, wherein the predetermined range is set in accordance with a dynamic range of an image sensor used to acquire image data by the acquisition unit.

5. The image capture apparatus according to claim 1, wherein, as a dynamic range of an image sensor used to acquire image data by the acquisition unit is narrower, the predetermined range is set to a narrower range.

6. The image capture apparatus according to claim 1, wherein an exposure level is shifted from an optimum exposure level based on a photometry result by the exposure compensation value.

7. A method of controlling an image capture apparatus, comprising:
    setting an exposure compensation value in response to a selecting operation by a user;
    acquiring image data;
    performing photometry using the acquired image data;
    performing exposure control to acquire the image data in the acquiring step;
    performing gain control for the acquired image data;
    displaying a captured image reflecting the set exposure compensation value;
    controlling to, in a case that the exposure compensation value falls within a predetermined range, acquire the image data based on the exposure compensation value and in a case that the exposure compensation value falls outside the predetermined range, acquire the image data based on a value at an end of the predetermined range; and controlling, in a case that the exposure compensation value falls outside the predetermined range, reflect the gain for the image data based on a difference between the exposure compensation value and the value at the end of the predetermined range.

8. The method according to claim 7, wherein an exposure level is shifted from an optimum exposure level based on a photometry result by the exposure compensation value.

9. An image capture apparatus comprising a processor and a memory which function as:
   a setting unit which sets an exposure compensation value in response to a selecting operation by a user;
   a display unit which displays a captured image reflecting the exposure compensation value set by the setting unit; and
   a control unit which controls to, in a case that the exposure compensation value falls within a predetermined range, acquire image data based on the exposure compensation value with a first display control, and in a case that the exposure compensation value falls outside the predetermined range, acquire the image data based on the exposure compensation value and a value at an end of the predetermined range with a second display control which is different from the first display control.

10. The image capture apparatus according to claim 9, wherein an exposure level is shifted from an optimum exposure level based on a photometry result by the exposure compensation value.

11. A method of controlling an image capture apparatus, comprising:
   setting an exposure compensation value in response to a selecting operation by a user;
   displaying a captured image reflecting the set exposure compensation value; and
   controlling to, in a case that the exposure compensation value falls within a predetermined range, acquire image data based on the exposure compensation value with a first display control, and in a case that the exposure compensation value falls outside the predetermined range, acquire the image data based on the exposure compensation value and a value at an end of the predetermined range with a second display control which is different from the first display control.

12. The method according to claim 11, wherein an exposure level is shifted from an optimum exposure level based on a photometry result by the exposure compensation value.

\* \* \* \* \*